Sept. 29, 1959  J. WITHERSPOON, JR  2,906,846
CONTROL DEVICE
Filed Feb. 28, 1957

INVENTOR.
Jack Witherspoon Jr.
BY
*Albert J. Henderson*
HIS ATTORNEY.

United States Patent Office 2,906,846
Patented Sept. 29, 1959

2,906,846

CONTROL DEVICE

Jack Witherspoon, Jr., Knoxville, Tenn., assignor to Robertshaw-Fulton Controls Company, Greensburg, Pa., a corporation of Delaware Application February 28, 1957, Serial No. 643,189

5 Claims. (Cl. 219—20)

This invention relates to a control device for a heating appliance and has particular application in automatically controlling the operation of a clothes drier.

The operation of conventional clothes driers is automatically controlled by a temperature-time device utilizing a first switch to control a timer mechanism and a second switch to control a heater. Each switch controls an independent operation with the result that the timer mechanism operates continuously while the heater is cycled in accordance with existing conditions.

It is an object of this invention to integrate the heating operation control and the timing operation control of a heating appliance into a unitary automatic control device.

Another object of this invention is to control the final temperature of a heating appliance by varying the running time of its timer mechanism.

A further object of this invention is to raise successively the controlled temperature of a heating appliance by energizing a timer mechanism and an auxiliary heater whenever a main heater is de-energized by its thermostat.

This invention has another object in that a first thermostat of a heating appliance actuates the operating member of a main heater in one direction, while a bimetal element which is responsive to an auxiliary heater acts on the operating member in an opposite direction.

This invention has another object in that the thermostatic element of a clothes drier heater operates a switch in series with the heating unit and a second thermostatic element is utilized to vary the trip and reset temperature points of the first thermostatic element in accordance with ambient temperature conditions.

Other objects and advantages of this invention will become apparent from the following description when considered in connection with the accompanying drawings wherein.

While the invention is shown and described in connection with an electric heating appliance, it should be understood that it is equally applicable to the construction of a heating appliance operated by other types of energy, such as gas.

Figure 2:
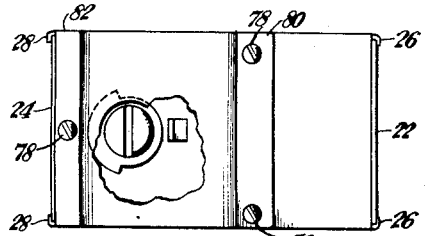
Fig. 2 is a top plan view of Fig. 1 with the cover partially broken away to expose a calibration screw.
Figure 1:
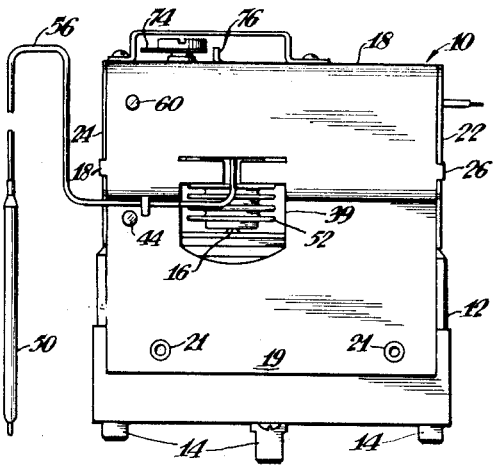
Fig. 1 is a side elevation of a control device embodying this invention.
Figure 3:
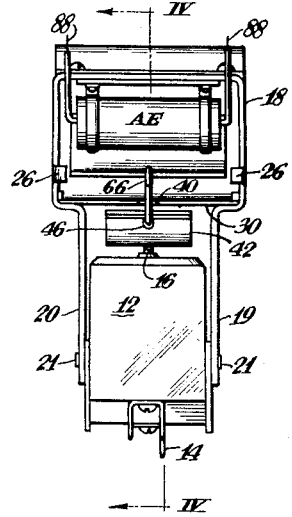
Fig. 3 is an end view in elevation with an insulating end plate removed.

Referring to Fig. 1, there is shown a control device, indicated generally at 10, having a conventional snap action switch 12. Connectors 14 protrude from the lower portion of switch 12 and a reciprocating actuator pin 16 protrudes from the upper portion thereof. A U-shaped housing 18 has the lower portion of its legs 19, 20 attached to respective sides of switch 12 by any suitable means, such as rivets 21. The upper portion of housing 18 is enclosed by insulating end plates 22, 24 held in place by suitable flanges 26, 28 on housing 18.

Figure 4:
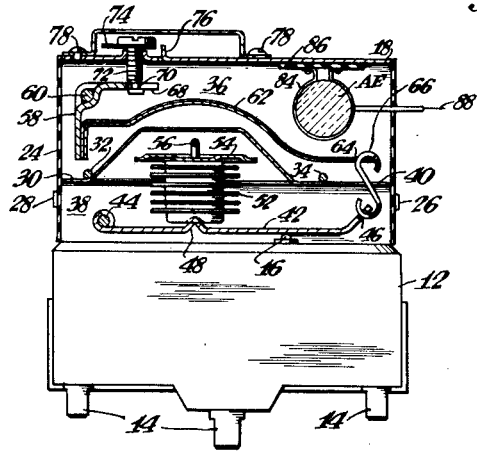
Fig. 4 is a sectional view taken along line IV—IV of Fig. 3.

As is illustrated in Fig. 4, a baffle plate 30 divides the upper portion of housing 18 into a bimetal compartment 36 and a bellows compartment 38. A cutout section 39 in each leg 19 and 20 of the housing 18 ventilates the bellows compartment 38. Plate 30 is fastened to the housing 18 by a pair of pins 32, 34 and has a cutout 40 adjacent one of the pins for a purpose to be described hereinafter. A switch actuating lever 42 is positioned in the bellows compartment 38 so that its undersurface is in engagement with actuator pin 16, and one end thereof is pivotally attached to pivot pin 44 which is secured to the housing 18. The opposite end of lever 42 has an angularly bent section with an aperture 46 therethrough. Intermediate its ends, the lever 42 is provided with a projection 48 extending upwardly from its upper surface.

A temperature sensitive device comprises a bulb 50 which is positioned to be responsive to the clothes drier air temperature, a bellows 52 which is located in bellows compartment 38 by means of a fastening plate 54 rigidly attached to the housing 18, and a capillary tube 56 connecting bulb 50 to bellows 52. Bellows 52 is positioned between cutout sections 39 so that it will remain substantially cooler than the bulb 50 during the drying cycle.

An L-shaped bracket 58 is pivotally mounted in the bimetal compartment 36 by means of a pivot pin 60 which is secured to the housing 18. A bimetal element 62 has an aperture 64 in one end thereof while its opposite end is rigidly attached to the pivotal bracket 58. An S-shaped hook 66, centrally disposed in the notch 40 of the baffle plate 30, has one end hooked through the aperture 64 in the bimetal element 62 in the bimetal compartment 36 while its opposite end is hooked through aperture 46 in the lever 42 in the bellows compartment 38. Bracket 58 is provided with a notched end 68 to receive the reduced portion 70 of a threaded calibrating screw 72. Rotation of calibrating screw 72 is limited by an extension 74 on the head thereof engageable with a stop 76 provided on the housing 18. Calibrating screw 72 is threaded into the housing 18 and is provided with a U-shaped cover which is attached to the top of housing 18 by any suitable means, such as screws 78 extending through flanges 80, 82 which are attached to cover 74.

An auxiliary heater AE, in the form of a resistor, is positioned in the bimetal chamber 36 by a bracket 84 which is attached to the housing 18 with a strip of insulating material 86 disposed therebetween. The auxiliary heater AE is provided with a pair of lead wires 88 for connection to an electrical circuit.

A circuit for the clothes drier main heater E is completed from line L1 to line L2 by the contacts TC which are manually closed and are opened by the timer mechanism T upon completion of the predetermined amount of runout time. The switch 12 actuated by operation member 42 is placed in series circuit relationship with the main heater E. Whenever switch 12 is in its first position, as is illustrated in Fig. 5, contacts TC are in series circuit relationship with the clothes drier main heater E; movement of switch 12 to its second position opens the circuit for main heater E and completes a circuit for timer T and auxiliary heater AE by placing contacts TC in series circuit relationship with the timer T and the auxiliary heater AE.

Figure 5:
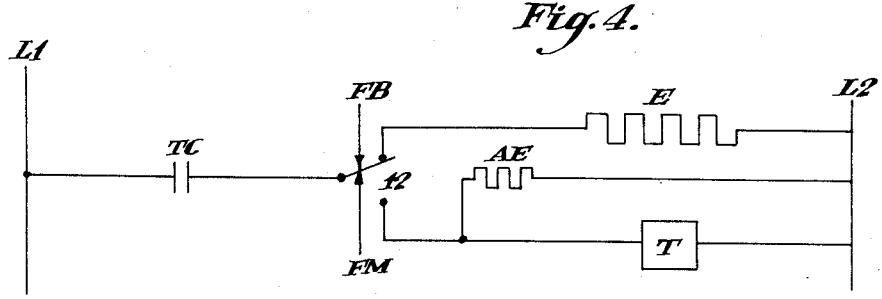
Fig. 5 is a diagram showing a preferred form of an electric circuit for a heating appliance control.

In the operation of this device, the snap action switch 12 is in a normally closed position, as is shown in Fig. 5, and the calibrating screw 72 is adjusted to the proper initial trip point determined by design. The bulb 50, bellows 52 and capillary tube 56 comprise a closed system filled with an expansible substance so that an increase of bulb temperature produces an expansion of bellows 52. The clothes drier is now put in operation by manual rotation of a timer knob (not shown) to a predetermined amount of runout time; this closes contacts TC and energizes the main heater E by completing a circuit from line L1, through contacts TC, switch 12, and main heater E to line L2.

As the clothes start to dry, the bulb temperature rises and produces an expansion of bellows 52. The bottom of bellows 52 engages projection 48 on the pivotal lever 42, so that expansion of bellows 52 exerts force FB on lever 42 to move reciprocal pin 16 of snap acting switch 12. Movement of lever 42 is opposed by the second thermostatic element 62 which is connected thereto by an S-shaped hook 66 and which serves as a return spring whose spring force FM is increased with an increase in ambient temperature surrounding it. When switch 12 trips, the circuit to the main heater E is broken and the circuit for the auxiliary heater AE is completed from line L1, through contacts TC, switch 12, and auxiliary heater AE to line L2; at the same time, the timer T, in parallel circuit relationship with auxiliary heater AE, is energized by a circuit from line L1 through contacts TC, switch 12, and timer T to line L2. Thus the timer T only runs when the main heater E is de-energized and the time is accumulative so that the total de-energized time completes the drying cycle. With the main heater E de-energized, the bulb 50 is cooling so that the bellows force FB is decreasing; at the same time, the energized auxiliary heater AE is heating the second thermostatic element 62 so that the bimetallic force FM is increasing. When the switch 12 is reset, the main heater E is again energized while the auxiliary heater AE and the timer T are de-energized. This cycle then repeats, with each successive trip point of switch 12 being at a higher temperature than the last so that hotter air is automatically provided on the longer time setting necessary for heavy loads. Also, a predetermined short time setting automatically provides cooler air for delicate loads.

From the foregoing it will be noted that the timer T totals the off-time of the main heater E while the load cools at a rate dependent on its mass. At the second trip temperature, switch 12 returns power to the main heater E and the time summation ceases. This cycle is repeated until the time, predetermined for a particular fabric load, has been consumed. Although the total off-time is constant for any one setting, varying amounts of power are consumed after the first thermostat actuation, depending on load size. The particular load being dried controls this variation, thus practically eliminating the human error of timer setting.

Inasmuch as this invention is subject to many variations and modifications, it is intended that all matter contained in the above description of the embodiment shown herein shall be interpreted as illustrative and not in a limiting sense.

What is claimed is:

1. In a control device, the combination comprising a housing, an apertured plate member in said housing dividing the same into a bimetal compartment and a bellows compartment, a switch actuator movably mounted in the bellows compartment, a bellows expansible and contractible in response to remote temperature variations and being disposed in the bellows compartment in engagement with said actuator for moving the same in accordance with such remote temperature variations, a bimetal mounted in the bimetal compartment and being responsive to ambient temperature variations therein, and means extending through said plate member and being operably connected between said bimetal and said actuator for modifying the movement thereof in accordance with such ambient temperature variations.

2. The combination as recited in claim 1 wherein said bimetal is mounted on a lever and an adjusting screw engages said lever to adjust the position of said bimetal for calibration purposes.

3. In a control device, the combination comprising a switch actuator having a movable end and a pivotally mounted end, a bellows being expansible and contractible in response to remote temperature variations, said bellows having a movable portion operably engaging said actuator and applying an actuating force thereon, a bimetal element operable in response to ambient temperature variations, said bimetal element having a movable end and an adjustably mounted end, a restraining member operably connected between the movable ends of said bimetal element and said actuator for applying a restraining force on said actuator according to ambient temperature conditions, and heating means controllable by said switch actuator and being disposed adjacent said bimetal element to vary the ambient temperature conditions influencing said bimetal element.

4. The combination as recited in claim 3 characterized in that the adjustably mounted end of said bimetal element is secured to a pivotally mounted bracket and a calibration screw is operably attached to said bracket whereby adjustment of said calibration screw causes pivotal movement of said bracket to effect calibration of said bimetal element.

5. In a control device, the combination comprising a housing, a control switch carried by said housing and being operable in a first position to control a main heater and in a second position to control an auxiliary heater, an apertured baffle plate in said housing dividing the same into a bimetal compartment and a bellows compartment, an actuator for said switch disposed in said bellows compartment and having one end pivotally mounted and a movable end, a bellows disposed in said bellows compartment and being expansible and contractible in response to remote temperature variations influenced by the main heater, said bellows having a mounting portion and a movable portion operably engaging said actuator to cause movement thereof, a bimetal element operable in response to ambient temperature variations influenced by the auxiliary heater, said bimetal element having an adjustably mounted end and a movable end, and a restraining hook member extending through said apertured baffle plate and having opposite ends respectively disposed in said bellows and bimetal compartments, said opposite ends being connected to the respective movable ends of said bimetal element and said actuator and forming an operable connection therebetween to restrain the movement of said actuator according to ambient temperature variations.

References Cited in the file of this patent

UNITED STATES PATENTS

| | | |
|---|---|---|
| 1,886,439 | Wells | Nov. 8, 1932 |
| 2,257,477 | Newton | Sept. 30, 1941 |
| 2,428,525 | Osterheld | Oct. 7, 1947 |
| 2,475,291 | Osterheld | July 5, 1949 |
| 2,611,850 | Walton | Sept. 23, 1952 |
| 2,715,672 | Barlow | Aug. 16, 1955 |
| 2,715,673 | Schroeder | Aug. 16, 1955 |
| 2,743,532 | Steward | May 1, 1956 |
| 2,767,293 | Jordan et al. | Oct. 16, 1956 |
| 2,775,047 | Morrison | Dec. 25, 1956 |